(12) United States Patent
Brookins

(10) Patent No.: US 10,190,051 B2
(45) Date of Patent: Jan. 29, 2019

(54) EMULSIFICATION OF HYDROPHOBIC ORGANOPHOSPHOROUS COMPOUNDS

(71) Applicant: Alexium, Inc., Greer, SC (US)

(72) Inventor: Robert Neal Brookins, Simpsonville, SC (US)

(73) Assignee: ALEXIUM, INC., Greer, SC (US)

( * ) Notice: Subject to any disclaimer, the term of this patent is extended or adjusted under 35 U.S.C. 154(b) by 224 days.

(21) Appl. No.: 14/724,128

(22) Filed: May 28, 2015

(65) Prior Publication Data

US 2015/0353833 A1 Dec. 10, 2015

Related U.S. Application Data

(60) Provisional application No. 62/010,185, filed on Jun. 10, 2014.

(51) Int. Cl.
| | |
|---|---|
| *C09K 21/14* | (2006.01) |
| *C09K 21/12* | (2006.01) |
| *B01F 17/00* | (2006.01) |

(52) U.S. Cl.
CPC .......... *C09K 21/14* (2013.01); *B01F 17/0064* (2013.01); *C09K 21/12* (2013.01)

(58) Field of Classification Search
CPC ...................................................... C09K 21/12
USPC ......................................................... 523/127
See application file for complete search history.

(56) References Cited

U.S. PATENT DOCUMENTS

| | | | | |
|---|---|---|---|---|
| 4,146,499 A | * | 3/1979 | Rosano | A01N 25/04 166/270.1 |
| 4,335,178 A | | 6/1982 | Fearing | |
| 4,385,000 A | | 5/1983 | Walz et al. | |
| 4,981,615 A | * | 1/1991 | Gunkel | C09K 21/12 252/608 |
| 5,766,818 A | | 6/1998 | Smith et al. | |
| 5,863,698 A | | 1/1999 | Patel et al. | |
| 5,869,423 A | | 2/1999 | Frisch et al. | |
| 5,944,650 A | | 8/1999 | Hu et al. | |
| 5,965,659 A | * | 10/1999 | Kubo | C08L 51/003 524/504 |
| 6,068,961 A | | 5/2000 | Dutoff et al. | |
| 6,084,054 A | | 7/2000 | Barren et al. | |
| 6,117,915 A | | 9/2000 | Pereira et al. | |
| 6,132,924 A | | 10/2000 | Patel et al. | |
| 6,204,227 B1 | | 3/2001 | Rao et al. | |
| 6,268,102 B1 | | 7/2001 | Hopper et al. | |
| 6,274,150 B1 | | 8/2001 | Simonnet et al. | |
| 8,993,506 B2 | | 3/2015 | Fütterer et al. | |
| 2002/0025986 A1 | * | 2/2002 | Rodham | A01N 25/28 516/98 |
| 2003/0050194 A1 | | 3/2003 | Hopkinson et al. | |
| 2006/0257637 A1 | * | 11/2006 | Pereira | B82Y 10/00 428/221 |
| 2013/0260626 A1 | * | 10/2013 | Stowell | D06M 13/244 442/141 |

FOREIGN PATENT DOCUMENTS

| | | |
|---|---|---|
| CN | 101525481 | 9/2009 |
| CN | 101970749 | 2/2011 |
| IN | 201717000695 | 4/2017 |
| JP | 2000328445 | 11/2000 |
| JP | 2001254268 | 9/2001 |
| JP | 2002088368 | 3/2002 |
| JP | 2005015947 | 1/2005 |
| JP | 2006274515 | 10/2006 |
| JP | 2009029889 A | 2/2009 |
| WO | 2001020986 A1 | 3/2001 |
| WO | WO 2008/151986 * | 12/2008 |
| WO | 2009120621 A2 | 10/2009 |
| WO | WO 2012/116886 * | 9/2012 |
| WO | 2015189739 | 12/2015 |
| WO | 2015189739 A1 | 12/2015 |

OTHER PUBLICATIONS

International Patent Application No. PCT/IB2015/054084, International Search Report and Written Opinion, dated Aug. 14, 2015, 12 pages.

Zhang et al., "Stability of etofenprox in water emulsion induced by block copolymer and surfactant," *Colloids and Surfaces A: Physicochemical and Engineering Aspects*, Elsevier, Amsterdam, N L, vol. 422, Jan. 24, 2013, pp. 191-198.

PCT/IB2015/054084, "International Preliminary Report on Patentability", dated Dec. 22, 2016, 7 pages.

Porter et al. "Handbook of Surfactants", Blackie & Son Ltd., New York, NY, 1991, pp. 116-131, 150-155.

Tadros, "Applied Surfactants", Wiley-VCH Verlag GmbH & Co. KGaA, Weinheim, 2005, pp. VII-17.

Product No. 282103 Specification, "TRITON™ X-100", Sigma-Aldrich, retrieved from the internet on Sep. 5, 2017, accessed online at: http://www.sigmaaldrich.com/catalog/product/aldrich/282103?lang=en&region=US.

(Continued)

*Primary Examiner* — Doris L Lee

(74) *Attorney, Agent, or Firm* — Kilpatrick Townsend & Stockton LLP

(57) ABSTRACT

An emulsion includes at least one polymeric surfactant, water and at least one organophosphorous compound. The emulsion may include from about 1% to about 40% of the polymeric surfactant and from about 40% to about 80% of the organophosphorous compound. The emulsion may further include at least one salt or additional surfactant. The at least one polymeric surfactant may include silicone-based surfactants, polyoxypropylene-based surfactants, graft copolymers of polysaccharides, and combinations thereof. The at least one polymeric surfactant may account for about 25% to about 100% by weight of the surfactant content in the emulsion and the at least one secondary surfactant, if present, may account for up to about 75% by weight of the surfactant content in the emulsion. The emulsion may have an average dispersed phase drop size of less than about 5 micron, or less than about 1 micron, after 6 months.

15 Claims, No Drawings

(56) References Cited

OTHER PUBLICATIONS

Technical Data Sheet, "Triton™ X-100 Surfactant", The Dow Chemical Company, form 119-01882-1207, retrieved from the internet on Sep. 5, 2017, accessed online at: http://www.dow.com/assets/attachments/business/pcm/triton/triton_x-100/tds/triton_x-100.pdf.

Chinese Patent Application No. 201580040405.0, Office Action dated Feb. 14, 2018, 17 pages (9 pages of English Translation and 8 pages of Original Document).

* cited by examiner

EMULSIFICATION OF HYDROPHOBIC ORGANOPHOSPHOROUS COMPOUNDS

RELATED APPLICATION

The present application claims the benefit of U.S. Provisional Application No. 62/010,185, filed Jun. 10, 2014, the disclosure of which is incorporated herein by this reference in its entirety.

FIELD OF THE INVENTION

Embodiments of the invention relate to stable emulsions including hydrophobic organophosphorous compounds and methods for preparing them.

BACKGROUND

Organophosphorous compounds have utility in a variety of applications. For example, when applied to textiles, integrated in resins, or extruded in thermoplastics, certain organophosphorous compounds provide flame retardant properties to the final product.

For ease of application, it is sometimes desirable to provide organophosphorous compound products in the form of an emulsion. Such emulsions have been formed using surfactants such as ethoxylated linear alcohols or ethoxylated alkyl phenols. These emulsions have limited shelf life, however, as they have average drop sizes of greater than 1 micron and have a tendency to coalesce within about a month after being made.

SUMMARY

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

Embodiments of the invention include a composition including an emulsion, the emulsion including at least one polymeric surfactant, water and at least one organophosphorous compound selected from the group consisting of:

a.

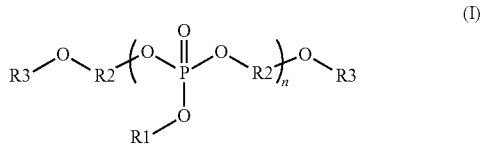

(I)

wherein
each R1 is independently a monovalent aryl, arylalkyl, or alkyl substituent containing up to 20 carbon atoms,
each R3 is independently a monovalent aryl, arylalkyl, alkyl, hydrogen, phosphate ester, silyl, or phosphonate ester substituent containing up to 20 carbon atoms;
each R2 is independently a divalent aryl, arylalkyl, or alkyl substituent containing up to 20 carbon atoms;
R1, R3 and R2 each optionally include one or more heteroatoms in the substituents; and
n is from 1 to 100;

b.

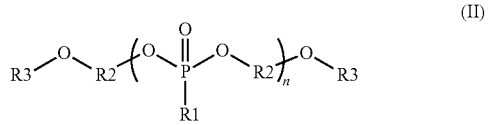

(II)

wherein
each R1 is independently a monovalent aryl, arylalkyl, or alkyl substituent containing up to 20 carbon atoms,
each R3 is independently a monovalent aryl, arylalkyl, alkyl, hydrogen, phosphate ester, silyl, or phosphonate ester substituent containing up to 20 carbon atoms;
each R2 is independently a divalent aryl, arylalkyl, or alkyl substituent containing up to 20 carbon atoms;
R1, R3 and R2 each optionally include one or more heteroatoms in the substituents; and
n is from 1 to 100; and c.

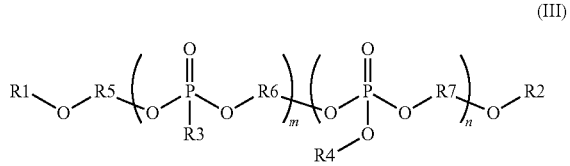

(III)

wherein
R1 and R2 are independently monovalent aryl, arylalkyl, alkyl, hydrogen, phosphate ester, silyl, or phosphonate ester substituents containing up to 20 carbon atoms;
each R3 and R4 are independently monovalent aryl, arylalkyl, or alkyl substituents containing up to 20 carbon atoms;
R5 is a divalent aryl, arylalkyl, or alkyl substituent containing up to 20 carbon atoms;
each R6 and R7 are independently divalent aryl, arylalkyl, or alkyl substituents containing up to 20 carbon atoms;
R1, R2, R3, R4, R5, R6, and R7 each optionally include one or more heteroatoms in the substituents;
m is from 1 to 100; and
n is from 1 to 100.

In some embodiments, the emulsion includes at least about 1% of the at least one polymeric surfactant and up to about 80% of the organophosphorous compound. The emulsion may include from about 1% to about 40% of the at least one polymeric surfactant and from about 40% to about 80% of the organophosphorous compound.

In certain embodiments the emulsion includes from about 1% to about 10% of the at least one polymeric surfactant.

In yet other embodiments the emulsion includes at least one salt or additional surfactant.

The at least one polymeric surfactant may be selected from the group consisting of silicone-based surfactants, polyoxypropylene-based surfactants, graft copolymers of polysaccharides, and combinations thereof.

In some embodiments the emulsion further includes at least one secondary surfactant selected from the group consisting of an anionic surfactant, a cationic surfactant, a non-polymeric non-ionic surfactant, a further polymeric surfactant, and combinations thereof. The at least one polymeric surfactant may account for about 25% to about 100% by weight of the surfactant content in the emulsion and the at least one secondary surfactant may account for up to about 75% by weight of the surfactant content in the emulsion.

In certain embodiments the emulsion further comprises at least one salt in an amount of approximately 0.1 to about 5% by weight of the emulsion.

In further embodiments the emulsion has an average dispersed phase drop size of less than about 5 micron after 6 months, or the emulsion has an average dispersed phase drop size of less than about 1 micron after 6 months.

In one embodiment the content of organophosphorous compound in the emulsion is from about 40% to a concentration corresponding to that in which phase inversion occurs in the emulsion.

In some embodiments the at least one organophosphorous compound is the compound of Formula (I), and wherein:
R1 is a phenyl group, R2 is a phenyl group covalently bonded in the 1 and 3 position, R3 is a diphenyl phosphate, and n is from 1 to 7;
R1 is a phenyl group, R2 is a 1,1-dimethyl-1,1-di(4'-phenyl) that is covalently bonded in the 1' positions, R3 is a diphenyl phosphate, and n is from 1 to 7;
R1 is a phenyl group, R2 is a mixture of ethyl and phenyl groups, R3 is a diphenyl phosphate, and n is from 1 to 7;
R1 is a methyl group, R2 is a phenyl group that is covalently bonded in the 1 and 3 position, R3 is an acetyl group, and n is from 1 to 15; or
R1 is an isopropyl group, R2 is an octyl group, R3 is a hydrogen, and n is from 1 to 8.

In other embodiments the at least one organophosphorous compound is the compound of Formula (II), and wherein:
R1 is a methyl group, R2 is a phenyl group covalently bonded in the 1 and 3 position, R3 is a hydrogen, and n is from 1 to 10;
R1 is a methyl group, R2 is a phenyl group covalently bonded in the 1 and 3 position, R3 is an acetyl group, and n is from 1 to 10;
R1 is a phenyl group, R2 is a phenyl group covalently bonded in the 1 and 3 positions, R3 is a silyl group, and n is from 1 to 20; or
R1 is a hydroxymethyl group, R2 is a phenyl group covalently bonded in the 1 and 4 positions, and n is from 1 to 15.

Embodiments of the invention also relate to a method for forming an emulsion including at least one polymeric surfactant, water and at least one organophosphorous compound selected from the group consisting of:

a.

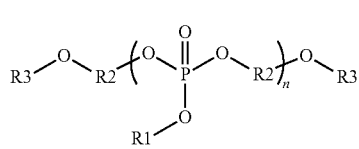
(I)

wherein
each R1 is independently a monovalent aryl, arylalkyl, or alkyl substituent containing up to 20 carbon atoms,
each R3 is independently a monovalent aryl, arylalkyl, alkyl, hydrogen, phosphate ester, silyl, or phosphonate ester substituent containing up to 20 carbon atoms;
each R2 is independently a divalent aryl, arylalkyl, or alkyl substituent containing up to 20 carbon atoms;
R1, R3 and R2 each optionally include one or more heteroatoms in the substituents; and
n is from 1 to 100;

b.

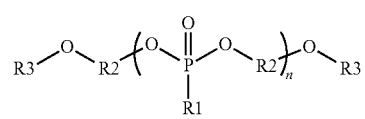
(II)

wherein
each R1 is independently a monovalent aryl, arylalkyl, or alkyl substituent containing up to 20 carbon atoms,
each R3 is independently a monovalent aryl, arylalkyl, alkyl, hydrogen, phosphate ester, silyl, or phosphonate ester substituent containing up to 20 carbon atoms;
each R2 is independently a divalent aryl, arylalkyl, or alkyl substituent containing up to 20 carbon atoms;
R1, R3 and R2 each optionally include one or more heteroatoms in the substituents; and
n is from 1 to 100; and c.

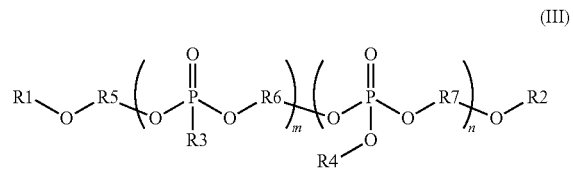
(III)

wherein
R1 and R2 are independently monovalent aryl, arylalkyl, alkyl, hydrogen, phosphate ester, silyl, or phosphonate ester substituents containing up to 20 carbon atoms;
each R3 and R4 are independently monovalent aryl, arylalkyl, or alkyl substituents containing up to 20 carbon atoms;
R5 is a divalent aryl, arylalkyl, or alkyl substituent containing up to 20 carbon atoms;
each R6 and R7 are independently divalent aryl, arylalkyl, or alkyl substituents containing up to 20 carbon atoms;
R1, R2, R3, R4, R5, R6, and R7 each optionally include one or more heteroatoms in the substituents;
m is from 1 to 100; and
n is from 1 to 100,
the method comprising:
mixing the at least one polymeric surfactant and at least one organophosphorous compound to form a homogeneous mixture; and
adding water to the homogeneous mixture while stirring the mixture until an oil-in-water emulsion is formed.

In some embodiments of the method, at least one additional surfactant is mixed with the at least one polymeric surfactant and at least one organophosphorous compound.

In a further embodiment of the method, at least one salt is added to the homogeneous mixture with the water.

In an embodiment of the method the emulsion includes from about 1% to about 40% of the at least one polymeric surfactant and the content of organophosphorous compound in the emulsion is from about 40% to a concentration corresponding to that in which phase inversion occurs in the emulsion.

In embodiments of the method the at least one polymeric surfactant is selected from the group consisting of silicone-based surfactants, polyoxypropylene-based surfactants, graft copolymers of polysaccharides, and combinations thereof.

In further embodiments the emulsion formed according to the method has an average dispersed phase drop size of less than about 1 micron after 6 months.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention relate to stable emulsions including hydrophobic organophosphorous compounds and methods for preparing them. These organophosphorous compounds are generally organophosphate, organophosphonates, or mixtures of these. Such compounds described in the present application are referred to herein as "OPs."

In some embodiments, the organophosphorous compounds are comprised of phosphate esters with chemical structures described with reference to formula (I) below. In this structure, R1 is a monovalent aryl, arylalkyl, or alkyl substituents containing up to 20 carbon atoms, optionally including one or more heteroatoms in these substituents. R3 is a monovalent aryl, arylalkyl, alkyl, hydrogen, phosphate ester (where the oxygen covalently bonds to R3 to the phosphorous of this substituent), silyl, or phosphonate ester (where the oxygen covalently bonds to R3 to the phosphorous of this substituent). R3 may contain up to 20 carbon atoms, optionally including one or more heteroatoms in these substituents. R2 is a divalent aryl, arylalkyl, or alkyl substituent containing up to 20 carbon atoms, optionally including one or more heteroatoms in these substituents. As shown in formula (I), R2 is covalently bonded to oxygens in the compound; these oxygens can bond to various positions of R2. For example, in one embodiment, R2 is a phenyl group where the oxygens bond to the 1 and 3 position. In another example, R2 is a phenyl group where the oxygens bond to the 1 and 4 position. In the compounds of formula (I), the phosphate can be composed of a repeat unit where n can vary from 1 to 100, preferably from 1 to 20, and more preferably from 1 to 10. Additionally, a given organophosphate may be composed of more than one R1, R2 or R3 variant in the same compound. Specific examples of interest are shown with reference to the following:

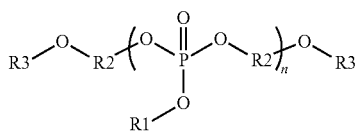

(I)

where,
R1 is a phenyl group, R2 is a phenyl group covalently bonded in the 1 and 3 position, R3 is a diphenyl phosphate, and n=1-7;

R1 is a phenyl group, R2 is a 1,1-dimethyl-1,1-di(4'-phenyl) that is covalently bonded in the 1' positions, R3 is a diphenyl phosphate, and n=1-7;

R1 is a phenyl group, R2 is a mixture of ethyl and phenyl groups, R3 is a diphenyl phosphate, and n=1-7;

R1 is a methyl group, R2 is a phenyl group covalently bonded in the 1 and 3 position, R3 is an acetyl group, and n=1-15; and R1 is an isopropyl group, R2 is an octyl group, R3 is a hydrogen, and n=1-8.

In some embodiments, the organophosphorous compounds are comprised of phosphonate esters with the chemical structure described with reference to formula (II) below. In this structure, R1 is a monovalent aryl, arylalkyl, or alkyl substituents containing up to 20 carbon atoms, optionally including one or more heteroatoms in these substituents. R3 is a monovalent aryl, arylalkyl, alkyl, hydrogen, phosphate ester (where the oxygen covalently bonds to R3 to the phosphorous of this substituent), silyl, or phosphonate ester (where the oxygen covalently bonds to R3 to the phosphorous of this substituent). R3 may contain up to 20 carbon atoms, optionally including one or more heteroatoms in these substituents. R2 is a divalent aryl, arylalkyl, or alkyl substituent containing up to 20 carbon atoms, optionally including one or more heteroatoms in these substituents. As shown in formula (II), R2 is covalently bonded to oxygens in the compound; these oxygens can bond to various positions of R2. For example, in one embodiment, R2 is a phenyl group where the oxygens bond to the 1 and 3 position. In another example, R2 is a phenyl group where the oxygens bond to the 1 and 4 position. In the compounds of formula (II), the phosphonate can be composed of a repeat unit where n can vary from 1 to 100, preferably from 1 to 20, and more preferably from 1 to 10. Additionally, a given organophosphonate may be composed of more than one R1, R2 or R3 variant in the same compound. Specific examples of interest are shown with reference to the following:

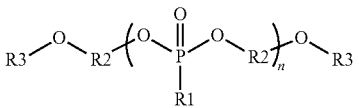

(II)

where,
R1 is a methyl group, R2 is a phenyl group covalently bonded in the 1 and 3 position, R3 is a hydrogen, and n=1-10;

R1 is a methyl group, R2 is a phenyl group covalently bonded in the 1 and 3 position, R3 is an acetyl group, and n=1-10;

R1 is a phenyl group, R2 is a phenyl group covalently bonded in the 1 and 3 positions, R3 is a silyl group, and n=1-20; and R1 is a hydroxymethyl group, R2 is a phenyl group covalently bonded in the 1 and 4 positions, and n=1-15.

Embodiments of the invention also include mixtures of these organophosphates and organophosphonates formed by blending these chemicals together as a mixture. This mixture is then emulsified as described herein.

Other embodiments of the invention include blending precursors of these organophosphates and organophosphates during the synthesis of these compounds. The chemical structure of the final compound is described with reference to formula (III) below. In this structure, R1 and R2 are independently monovalent aryl, arylalkyl, alkyl, hydrogen, phosphate ester (where the oxygen covalently bonds to R1 or R2 to the phosphorous of this substituent), silyl, or phosphonate ester (where the oxygen covalently bonds to R1 or R2 to the phosphorous of this substituent). R1 and R2 may contain up to 20 carbon atoms, optionally including one or more heteroatoms in these substituents. R3 and R4 are independently monovalent aryl, arylalkyl, or alkyl substituents containing up to 20 carbon atoms, optionally including one or more heteroatoms in these substituents. R5, R6, and R7 are divalent aryl, arylalkyl, or alkyl substituents containing up to 20 carbon atoms, optionally including one or more heteroatoms in these substituents. In the compounds of formula (III), the phosphonate segments can be composed of a repeat unit where m can vary from 1 to 100, preferably from 1 to 20, and more preferably from 1 to 10. Further, the phosphate segments can be composed of a repeat unit where n can vary from 1 to 100, preferably from 1 to 20, and more preferably from 1 to 10. The organophosphate segments may be composed of more than one R3, R4, R6 and R7 variant in the same compound. The repeat units of these organophosphate and organophosphonate segments may be randomly distributed in the final compound or in blocked segments, as is known in polymer chemistry.

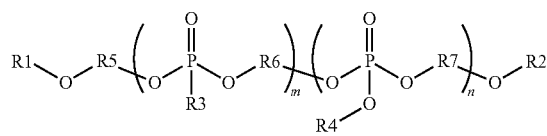

(III)

Stable emulsions of OPs according to embodiments of the invention include one or more OPs, at least one polymeric surfactant and water.

In some embodiments, the emulsion includes at least about 1% of at least one polymeric surfactant, up to about 80% OP, and balance water. In certain embodiments, the emulsion includes from about 1% to about 40% of at least one polymeric surfactant, from about 40% to about 80% OP, and balance water. In yet other embodiments, the emulsion includes from about 1% to about 30%, or from about 1% to about 20% or even from about 1% to about 10% of at least one polymeric surfactant. In further embodiments, and as explained below, the emulsion further includes at least one salt and/or at least one additional surfactant.

Any polymeric surfactant that provides suitable emulsification properties may be used in the composition, including but not necessarily limited to silicone-based surfactants, polyoxypropylene-based surfactants, graft copolymers of polysaccharides, and combinations thereof. In certain embodiments, the at least one polymeric surfactant may be an ethylene oxide/propylene oxide block copolymer. One example of such a polymeric surfactant is Pluronic® L 64, available from BASF.

In some embodiments, the emulsion includes at least one additional surfactant. The at least one additional surfactant may be provided to modify the interfacial energy of the emulsion, to improve the stability of the emulsion against different conditions (i.e., temperatures above room temperature, temperatures below room temperature, freeze/thaw stability, etc.), or to modify the physical properties of the emulsion (i.e., flow, viscosity, etc.). The type and amount of additional surfactant(s) may be selected based on the properties of the OP selected. In certain embodiments, the at least one additional surfactant is an anionic surfactant, such as but not limited to a sulfonate-based surfactant, a sulfate-based surfactant, a carboxylate-based surfactant, a phosphate-based surfactant, a phosphonate-based surfactant, and combinations thereof, although other anionic surfactants could be selected and are within the scope of this invention. In other embodiments, the at least one additional surfactant is a cationic surfactant, such as but not limited to a quaternary ammonium-based surfactant, an acidified amine-based surfactant, a phosphonium based surfactant, and combinations thereof, although other cationic surfactants could be selected and are within the scope of this invention. In further embodiments, the at least one additional surfactant is a non-polymeric, non-ionic surfactant, such as but not limited to an ethoxylated linear alcohol, an ethoxylated branched alcohol, an ethoxylated alkyl phenol, a fatty acid ester, an amine-functionalized C12-C20 alkane, an amide functionalized C12-C20 alkane, a polyol functionalized linear alcohol, and combinations thereof, although other non-polymeric non-ionic surfactants could be selected and are within the scope of this invention. In still other embodiments the at least one additional surfactant is another polymeric surfactant. In yet further embodiments, the at least one additional surfactant could include combinations of one or more of the anionic, cationic, non-polymeric non-ionic, other polymeric surfactants listed above and/or other surfactants known to those skilled in the art.

By way of background, the interfacial properties of a surfactant are frequently characterized by their relative amount of hydrophilic and lipophilic segments. This relative amount is called the hydrophilic-lipophilic balance, or "HLB." The cumulative HLB of the surfactants present in the emulsion will largely determine the relative amounts of the surfactants used.

In embodiments of the present invention, the polymeric surfactant may account for about 25% to 100% by weight of the surfactant content in the emulsion, while the one or more additional surfactants, if present in the emulsion, may account for up to about 75% by weight of the surfactant content in the emulsion. The one or more additional surfactants can thus be present in a greater amount in the emulsion than the polymeric surfactant. The amount of one or more additional surfactants that can be provided in the surfactant relative to the amount of polymeric surfactant generally depends on the cumulative HLB balance of the emulsion. In some embodiments of the present invention, the cumulative HLB of the surfactants used in the emulsion may be in the range of about 9-17.

Emulsions of the present invention may also contain at least one salt. The at least one salt, when included, is used to modify the solution properties of the dispersant (i.e., the water). Specifically, the at least one salt modifies the dielectric properties of the dispersant, which affects how well the components solubilize in the medium. The salt can also be used to buffer the emulsion's aqueous phase within a desired pH range. In addition, the at least one salt can interact with components in the emulsion, which affects how they are partitioned between the dispersed and dispersing phases. A person skilled in the art can select a suitable salt (or salts) based on these desired properties. In some emulsions, sodium chloride salt may be included in an amount of approximately 0.1 to about 5% by weight of the emulsion.

The OP emulsions may be formed using a phase inversion process. In such a process the one or more OPs, the at least one polymeric surfactant, and optional one or more additional surfactants (if used) are added to a mixing vessel and stirred until homogeneous. Water (optionally with the at least one salt) is added slowly while a mixer mixes the water into the OP/surfactant mixture. High shear mixers and multishaft mixers may be used to improve how efficiently these are mixed. As the water is initially added, a water-in-oil emulsion is created; as water is further added a critical concentration of water is reached at which phase inversion results which converts the emulsion into an oil-in-water emulsion. Water is then further added to achieve the desired concentration of OP in the emulsion. In some embodiments the surfactants may be added at some time during or after the addition of water.

Emulsions including one or more OPs and one or more polymeric surfactants such as those described herein can be stable for greater than 6 months in a wide range of storage conditions, including hot and cold conditions. In addition, the emulsions can have relatively small dispersed phase drop size ranges as compared to standard emulsion classifications. In particular, OP emulsions according to the present invention can have average dispersed-phase drop sizes ranging from about 70 nm to about 10 microns, or in some embodiments from about 70 nm to 5 microns, or less than about 10 microns, or even less than about 5 microns. In certain embodiments, the average dispersed-phase drop size ranges from about 190 nm to about 1 micron, or from about 190 nm to about 700 nm. In yet other embodiments, OP emulsions according to the present invention have dispersed phase drop sizes ranges of less than about 1 micron, or less than about 700 nm, or even less than about 500 nm.

Without being bound by any theory set forth herein, it is believed that the following helps to explain why polymeric surfactants such as those described herein can provide stable OP emulsions, in contrast to more conventional surfactants for emulsions. Initial research was started by looking at a large spectrum of surfactants to emulsify OPs. Results showed that standard surfactants used as emulsifiers, such as ethoxylated linear alcohols or ethoxylated alkyl phenols, provided emulsions having drop sizes greater than 1 micron and that tended to coalesce in less than one month, and most commonly in less than one day. Similar results were found for blends of other non-polymeric surfactants.

In contrast, polymeric surfactants, such as polyoxyethylene/polyoxypropylene copolymers, provided emulsions that were stable for months and had drop sizes less than 1 micron.

It is now thought that many traditional surfactants failed as emulsifiers for OPs because they contain a poor hydrophobe for the types of organophosphorous compounds of interest in the present application. Ideally, the hydrophobic segment of the surfactant will have a strong affinity for the OP being dispersed; this ensures the surfactant resides at the interface and is strongly "anchored" on the dispersed drop. Typical non-ionic surfactants and ionic surfactants have alkyl- and alkylbenzene-based hydrophobes. In contrast, many polymeric surfactants have either polyoxypropylene- or silicone-based hydrophobes, which is believed to have a greater affinity for OPs due to the high dipole moment of the phosphine-oxide bond and the moderate polarity of the oxypropylene and silicone hydrophobe (relative to an alkyl or alkylbenzene). Additionally, for complex molecular structures of a polymeric surfactant (i.e., random copolymer), the hydrophobic segments may provide sufficient affinity with OP derivatives to promote formation of a stable emulsion.

Beyond the chemical composition of the hydrophobe, the polymeric surfactant is believed to stabilize the dispersed OP through steric effects which stabilize the dispersed drops against coalescence.

As explained above, in some embodiments the emulsion may include at least about 1% of at least one polymeric surfactant, or from about 1% to about 40% of at least one polymeric surfactant. In yet other embodiments, the emulsion includes from about 1% to about 30%, or from about 1% to about 20% or even from about 1% to about 10% of at least one polymeric surfactant. In certain embodiments the emulsion could include more than 2%, or more than 5%, or more than 10%, or even more than 20% of at least one polymeric surfactant. As a general principle, increasing the amount of emulsifier would allow the particle size of the dispersed phase to be further reduced.

Discussing further the OP content in the emulsion, as explained above in some embodiments the emulsion includes up to about 80% OP. In other words, the emulsion may be as dilute as desired and there is no lower limit on the OP content. For practical purposes, however, it may be desirable for the emulsion to include at least about 40% OP, to have the desired stability, viscosity, and concentration of OP for potential applications.

As the OP content in the emulsion is increased above about 40%, the dispersed OP droplets are spatially constrained so the dispersed droplets impinge on one another. As the OP concentration significantly increases to about 60% or more, the degree of impingement increases, which may destabilize the droplets so they begin to coalesce. While this concentration may occur at an OP content of about 80%, it may be more or less than this. Thus, in certain embodiments the OP content in the emulsion may be from about 40% to the phase inversion concentration.

As explained herein, OP emulsions according to the present invention have stabilities of 6 months or greater in various conditions. For the purposes of this invention, stability may be assessed in a number of ways:
  Stability against gravity: If a product is not stable to gravity, the dispersed droplet will rise to the top of the solution (or sink to the bottom of the solution). Whether it rises or falls depends on the relative density of the dispersed and dispersing phases. Stability is determined by watching the solution over time to monitor this phase separation.
  Stability against temperature: An emulsion should generally be stable over a range of 3 to 45 degrees Celsius. This stability can be assessed by observing the sample to check for coalescence. Additionally, the sample can be checked with a particle size analyzer to see if the particle size has increased.
  Stability against freeze/thaw cycles: up to five freeze and thaw cycles are performed, and stability is assessed by a visual check for coalescence or by particle size analysis.

The following nonlimiting examples illustrate the preparation of emulsions within the scope of this invention:

EXAMPLES

Example 1

Preparation of an OP Emulsion 52 grams of the oligomeric form of resorcinol bis(diphenyl phosphate) (OP), 5.78 grams of Pluronic L-64 (polymeric surfactant), and 0.88 grams of Ralufon N9 (sulfonate surfactant) were placed into a sawtooth mixing vessel and mixed at approximately 1100 rpm until the mixture was well-mixed and homogeneous.

Water with 1% sodium chloride was added at a rate of 50 mL/min. Addition of water was continued until a total of 41 grams was added. At this point, the preparation of the emulsion was complete.

Example 2

Preparation of an OP Emulsion 60 grams of the oligomeric form of resorcinol bis(diphenyl phosphate) (OP), 6.7 grams of Pluronic L-64 (polymeric surfactant), and 0.45 grams of docusate sodium salt (salt) were placed into a sawtooth mixing vessel and mixed at approximately 1100 rpm until the mixture was well-mixed and homogeneous.

Water with 1% sodium chloride and 0.5% of acetate buffer was added at a rate of 50 mL/min. Addition of water was continued until a total of 32.65 grams was added. At this point, the preparation of the emulsion was complete.

Example 3

Preparation of an OP Emulsion 47 grams of Fyrol™ HF-5 (OP), 2.6 grams of Pluronic P-123 (polymeric surfactant), and 3.2 grams of Brij S100 (stearyl alcohol surfactant) were placed into a sawtooth mixing vessel and mixed at approximately 1100 rpm until the mixture was well-mixed and homogeneous. Fyrol™ HF-5 is a polymeric/oligomeric phosphorous ester flame retardant available from ICL Industrial Products.

Water was added at a rate of 50 mL/min. Addition of water was continued until a total of 47.2 grams was added. At this point, the preparation of the emulsion was complete.

Example 4

Preparation of an OP Emulsion 20 grams of Jeffamine M-2070 (polymeric surfactant), 20 grams of Pluronic L-121 (polymeric surfactant), and 5 grams of polypropylene glycol ($M_n$=425) were added to 55 grams of Poly(1,3-phenylene methylphosphonate) heated to 100° C. while stirring with an overhead mixer. The mixture was mixed until homogeneous.

The mixture was slowly poured into 550 grams of water while stirring with an overhead mixer.

In some applications, the emulsions described herein may be applied to textiles or integrated into epoxide, polyurethane, or polyamide-based resins or thermoplastics to provide flame retardant properties thereto. Other applications for the emulsions described herein may be applicable.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A composition comprising an emulsion, the emulsion comprising at least one polymeric surfactant, water and at least one hydrophobic organophosphorous compound selected from the group consisting of:

a.

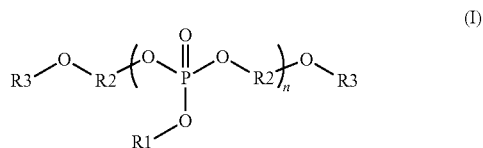
(I)

wherein
- each R1 is independently a monovalent aryl, arylalkyl, or alkyl substituent containing up to 20 carbon atoms,
- each R3 is independently a monovalent aryl, arylalkyl, alkyl, hydrogen, phosphate ester, silyl, or phosphonate ester substituent containing up to 20 carbon atoms;
- each R2 is independently a divalent aryl, arylalkyl, or alkyl substituent containing up to 20 carbon atoms;
- R1, R3 and R2 each optionally include one or more heteroatoms in the substituents; and
- n is from 1 to 100;

b.

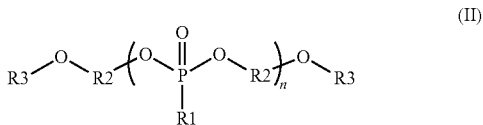
(II)

wherein
- each R1 is independently a monovalent aryl, arylalkyl, or alkyl substituent containing up to 20 carbon atoms,
- each R3 is independently a monovalent aryl, arylalkyl, alkyl, hydrogen, phosphate ester, silyl, or phosphonate ester substituent containing up to 20 carbon atoms;
- each R2 is independently a divalent aryl, arylalkyl, or alkyl substituent containing up to 20 carbon atoms;

R1, R3 and R2 each optionally include one or more heteroatoms in the substituents; and n is from 1 to 100; and c.

(III)

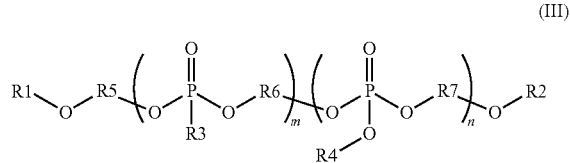

wherein

R1 and R2 are independently monovalent aryl, arylalkyl, alkyl, hydrogen, phosphate ester, silyl, or phosphonate ester substituents containing up to 20 carbon atoms;

each R3 and R4 are independently monovalent aryl, arylalkyl, or alkyl substituents containing up to 20 carbon atoms;

R5 is a divalent aryl, arylalkyl, or alkyl substituent containing up to 20 carbon atoms;

each R6 and R7 are independently divalent aryl, arylalkyl, or alkyl substituents containing up to 20 carbon atoms;

R1, R2, R3, R4, R5, R6, and R7 each optionally include one or more heteroatoms in the substituents;

m is from 1 to 100; and n is from 1 to 100, wherein the emulsion is an oil-in-water emulsion, and wherein the at least one hydrophobic organophosphorous compound forms the oil of the oil in water emulsion.

2. The composition of claim 1, wherein the emulsion comprises at least about 1% by weight of the at least one polymeric surfactant and up to about 80% by weight of the organophosphorous compound.

3. The composition of claim 1, wherein the emulsion further comprises at least one salt or additional surfactant.

4. The composition of claim 1, wherein the emulsion further comprises at least one salt in an amount of approximately 0.1 to about 5% by weight of the emulsion.

5. The composition of claim 1, wherein the emulsion has an average dispersed phase drop size of less than about 5 micron after 6 months.

6. The composition of claim 1, wherein the emulsion has an average dispersed phase drop size of less than about 1 micron after 6 months.

7. The composition of claim 1, wherein the content of organophosphorous compound in the emulsion is from about 40% by weight to a concentration corresponding to that in which phase inversion occurs in the emulsion.

8. The composition of claim 1, wherein the at least one organophosphorous compound is the compound of Formula (I), and wherein:

R1 is a phenyl group, R2 is a phenyl group covalently bonded in the 1 and 3 position, R3 is a diphenyl phosphate, and n is from 1 to 7;

R1 is a phenyl group, R2 is a 1,1-dimethyl-1,1-di(4'-phenyl) that is covalently bonded in the 1' positions, R3 is a diphenyl phosphate, and n is from 1 to 7;

R1 is a phenyl group, R2 is a mixture of ethyl and phenyl groups, R3 is a diphenyl phosphate, and n is from 1 to 7;

R1 is a methyl group, R2 is a phenyl group that is covalently bonded in the 1 and 3 position, R3 is an acetyl group, and n is from 1 to 15; or R1 is an isopropyl group, R2 is an octyl group, R3 is a hydrogen, and n is from 1 to 8.

9. The composition of claim 1, wherein the at least one organophosphorous compound is the compound of Formula (II), and wherein:

R1 is a methyl group, R2 is a phenyl group covalently bonded in the 1 and 3 position, R3 is a hydrogen, and n is from 1 to 10;

R1 is a methyl group, R2 is a phenyl group covalently bonded in the 1 and 3 position, R3 is an acetyl group, and n is from 1 to 10;

R1 is a phenyl group, R2 is a phenyl group covalently bonded in the 1 and 3 positions, R3 is a silyl group, and n is from 1 to 20; or R1 is a hydroxymethyl group, R2 is a phenyl group covalently bonded in the 1 and 4 positions, and n is from 1 to 15.

10. The composition of claim 1, wherein the emulsion comprises from about 1% to about 40% by weight of the at least one polymeric surfactant and from about 40% to about 80% by weight of the organophosphorous compound.

11. The composition of claim 10, wherein the emulsion comprises from about 1% to about 10% by weight of the at least one polymeric surfactant.

12. The composition of claim 1, wherein the at least one polymeric surfactant is selected from the group consisting of silicone-based surfactants, polyoxypropylene-based surfactants, graft copolymers of polysaccharides, and combinations thereof.

13. The composition of claim 12, wherein the at least one polymeric surfactant comprises a polyoxypropylene-based surfactant.

14. The composition of claim 1, wherein the emulsion further comprises at least one secondary surfactant selected from the group consisting of an anionic surfactant, a cationic surfactant, a non-polymeric non-ionic surfactant, a further polymeric surfactant, and combinations thereof.

15. The composition of claim 14, wherein the at least one polymeric surfactant accounts for about 25% to about 100% by weight of the surfactant content in the emulsion and the at least one secondary surfactant accounts for up to about 75% by weight of the surfactant content in the emulsion.

* * * * *